United States Patent [19]
Vilain et al.

[11] 3,878,299
[45] Apr. 15, 1975

[54] PLANT EXTRACTS HAVING PERIPHERAL CORONARY DILATORY AND VASODILATORY ACTION

[75] Inventors: Pol Ghislain Vilain; Daniel Bernard Beziat; Philippe Maurice Hatinguais; Henri Pierre Lauressergues, all of Castres, France

[73] Assignee: Investigations Scientifiques Pharmaceutiques, Castres, France

[22] Filed: Jan. 7, 1974

[21] Appl. No.: 431,465

Related U.S. Application Data
[63] Continuation of Ser. No. 159,528, July 2, 1971.

[30] Foreign Application Priority Data
July 23, 1970  France ............................... 70.27189

[52] U.S. Cl. ................................................ 424/195
[51] Int. Cl. ............................................. A61k 27/14

[58] Field of Search ...................... 424/195; 159/528

[56]            References Cited
FOREIGN PATENTS OR APPLICATIONS
2,096,983   7/1970   France OTHER PUBLICATIONS
Chemical Abstracts, Vol. 68: 58429S (1968).

*Primary Examiner*—Albert T. Meyers
*Assistant Examiner*—Donald B. Moyer
*Attorney, Agent, or Firm*—Breitenfeld & Levine

[57]            ABSTRACT

Extracts from the bark of the root of Poterium Spinosum, which are polyflavanic and heterosidic in nature, have a molecular weight of 500 to 3,000 and are soluble in water have a peripheral coronary dilatory and vasodilatory action.

2 Claims, No Drawings

PLANT EXTRACTS HAVING PERIPHERAL CORONARY DILATORY AND VASODILATORY ACTION

This application is a continuation of application Ser. No. 159,528, filed July 2, 1971.

This invention relates to plant extracts as novel medicaments which are characterised by their polyflavanic and optionally heterosidic nature, by their molecular weight which is in the range from approximately 500 to 3,000 and by their solubility in water. The invention also relates to pharmaceutical compositions which can be orally, parenterally or rectally administered and which contain active principles of the kind in question either on their own or associated with other active principles, and more particularly cardiotonics, sedatives and tranquillisers.

In other words, to produce a coronary dilator and vasodilator, it is sufficient to subject a plant species to extraction, to ensure that, before it is purified, the extract has a polyfavanic optionally heterosidic nature, that its molecular weight is between approximately 500 and 3,000 and that it is soluble in water. All these operations are within the capabilities of the average expert.

The plant species that is particularly suitable for the purposes of the invention is *Poterium spinosum* which is a thorny shrub of the rosaceae family, it should be noted that hitherto reference has only been made to hypoglycaemic properties which some authors have also attributed to $\beta$-glycyrrhetinic acid, its salts or esters.

The extraction processes employ such solvents as water, methanol, N-butanol, etc., or mixtures thereof.

In the case of *Poterium spinosum*, the best yields are obtained by aqueous or methanolic extraction of the bark of the root of this shurb. It is also possible to apply liquid-liquid extraction employing a mixture of water and N-butanol as the extraction solvent. Depending on the technique adopted, the crude extract yield can vary between 15 and 23 percent of the drug (from the bark of the root).

The aqueous or methanolic extracts can be purified by different methods until the active principles to which the invention relates are obtained: the most effective methods are those which comprise either passing the aqueous or methanolic extract through a gel of the kind marketed under the name Sephadex, or precipitating the active principles from a methanolic solution with a mixture of acetone and diethylether. Although other techniques such as using ion-exchange resins, salting out with ammonium sulphate, have been used, the yields they give are poorer. It is the techniques of purification with Sephadex gel which has been adopted to isolate the active principles determine their physico-chemical characteristics and their structure, as described hereinafter.

The following Examples illustrate the extraction of particularly active principles from bark of the root of *Poterium spinosum*.

EXAMPLE 1

Finely crushed bark from the root of *Poterium spinosum* (100 g) is extracted with 1 litre of boiling water for 30 minutes.

After filtration, the plant residue is subjected to a second extraction under identical conditions.

Following separation of the spent plant material, the two combined aqueous phases are evaporated in vacuo (15 mm. of mercury) at a temperature not exceeding 50°C.

The dry residue thus obtained is in the form of a brownish-red powder. Yield 25 to 30 percent. Purification: It is possible to obtain particularly active polyflavans by operating as follows:

100 mg of the powder obtained as described above is dissolved in 1 to 2 ml of 60 percent ethanol and the resulting solution poured into a Sephadex G 25 gel column 1 cm. in diameter and with a useful height of approximately 20 cm (i.e. 5 g of gel). Elution with 60 percent ethanol gives a highly coloured zone at the exclusion limit of the gel. This fraction comprised between the 6th and the 8th ml., following evaporation to dryness under reduced pressure, gives approximately 35 mg. of particularly active polyflavans.

EXAMPLE 2

100 g of finely crushed bark from roots of *Poterium spinosa* are exhausted at ambient temperature by two successive extractions with 1 litre of methanol.

After the two methanolic phases have been combined and the solvent evaporated under reduced pressure at a temperature not exceeding 50°C, a brownish-red powder is obtained in a yield of 20 to 25 g.

The powder thus obtained is taken up in 500 ml. of water.

After the insoluble fraction has been filtered, the aqueous solution is evaporated under the same conditions as before and gives 15 to 20 g of a brownish-red product rich in polyflavans. Purification: it is carried out by the method described in Example 1. Yield 50 to 60 percent.

With *Poterium spinosum* there is thus obtained a water-soluble polyflavanic heteroside with a molecular weight of from approximately 2000 to 3,000.

More specifically, the characteristics of the extract are as follows: Solubility: the product is soluble in water, methanol and low-molecular weight alcohols, sparingly soluble or insoluble in acetone, benzene, ether and chlorinated solvents. Absorption spectrum in ultraviolet and visible light: Solvent: methanol/distilled water/hydrochloric acid (25:75:0.1). Two absorption maxima are observed at wave lengths of 279 and 440 nm and two absorption minima at wave lengths of 258 and 410 nm. Infra-red absorption spectrum; (2 percent KBr discs) Position of the bands in $cm^{-1}$: 780, 825, 880, 1070, 1110, 1290, 1390, 1450, 1530, 1620, 1740, 2860, 2940, 3420. Molecular weight: (filtration through Sephadex G 25 gel as the medium)

A column 1 cm in diameter and 20 cm tall is filled with 5 g of G 25 gel swollen beforehand overnight in the following solvent: ethanol/water (60:40). The column is calibrated with Dextan Yellow (MW 20,000) and vitamin B 12 (MW 1357). The average exclusion volumes obtained would seem to indicate that the product in question has a molecular weight of from 2000 to 3,000.

Identification Reactions:

1. Reactions involving tannins: the reactions mentioned above are positive.
   precipitation with gelatin,
   precipitation with amines and amides, precipitation with salts, namely ammonium carbonate, potassium iodide, basic lead acetate, coloured reactions with ferric salts.

2. Identification reactions involving catechuic tannins: positive reaction with formaldehyde hydrochloride: abundant precipitate, reaction with bromine water: intense yellow precipitate with a colourless supernatant phase, no hazing or precipitation with ammonium sulphide.

3. Following hydrolysis, it was possible to detect an appreciable quantity of glucose.

Naturally, the methods for determining characteristics explained in reference to the extract of a particular plant are applicable to other extracts and make it possible to choose pharmacologically interesting substances.

Acute toxicity was determined in mice by intravenous and intraperitoneal administration: it was calculated by the method developed by MILLER and TAINTER, morality being calculated 48 hours after the product had been administered in solution in the physiological serum.

The results are as follows:

$LD_{50}$, intravenous: approximately 100 mg/kg $LD_{50}$ i.p. : approximately 150 mg/kg The interesting properties of the different batches of products were shown with regard to the cardio-vascular system, more particularly coronary output, peripheral vasomotion and capillary fragility.

Investigation of the effect on the coronary output was conducted on the isolated heart of a rabbit (weighing about 600 g) kept in a state of fibrillation by Langendorff's method as modified by Charlier.

With the products according to the invention, fibrillating hearts were found to undergo very marked coronary dilation up to 16 times greater than that produced by an equivalent dose of papaverine taken as reference substance. In addition, a more sustained action was observed after perfusin had ceased.

Under barium chloride, these products are capable of inducing a spasm to the same extent as papaverine. By contrast, they have no effect on the spasm of the ileum of guinea pigs induced by the same substance which would seem to show their selective activity on coronary vascular motion.

Peripheral vasomotion was studied by perfusion of the posterior tract of rats. The product is injected through the distal part of the aorta. The return circulation rate is measured on the vena cavae. In this region, too, these products developed a level of activity 10 to 16 times greater than that of papaverine taken as reference substance.

The arterial pressure of the rat was measured following administration of the product by the intravenous route. Paradoxically it shows hardly any reduction, the cardiac rhythm does not vary.

The first clinical results obtained have confirmed the results of the animal experiments, 1. in coronary disease and
2. in peripheral circulation disorders. It was not possible to detect any undesirable side effects: 4 to 5 gelatin-coated tablets each containing 10 mg of active principle are taken daily.

In addition to the gelatin-coated tablets referred to, the active principles can be presented in any suitable pharmaceuitcal forms. Naturally, the posology depends on the extract used and on the seriousness of the illness and also on the condition of the patient.

We claim:

1. A method of treating animals in need of coronary dilation and vasodilation which comprises the administration to such animal of from 2 mg. to 20 mg. of the composition comprising an extract obtained by extracting the bark of the root *Poterium spinosum* with a solvent selected from the group consisting of water, methanol, N-butanol, and mixtures thereof together with a pharmaceutical carrier, said extract having a molecular weight of from 500 to 3,000.

2. The method of claim 1 wherein the composition is obtained by aqueous extraction and fractional precipitation with a mixture of acetone and diethylether.

* * * * *